United States Patent
Tanaka et al.

(10) Patent No.: US 10,168,050 B2
(45) Date of Patent: Jan. 1, 2019

(54) AFTERBURNER AND AIRCRAFT ENGINE

(71) Applicant: IHI Corporation, Koto-ku (JP)

(72) Inventors: Shinji Tanaka, Tokyo (JP); Katsuyoshi Takahashi, Tokyo (JP); Jun Hosoi, Tokyo (JP)

(73) Assignee: IHI Corporation, Koto-ku (JP)

( * ) Notice: Subject to any disclaimer, the term of this patent is extended or adjusted under 35 U.S.C. 154(b) by 220 days.

(21) Appl. No.: 15/196,271

(22) Filed: Jun. 29, 2016

(65) Prior Publication Data

US 2016/0305665 A1  Oct. 20, 2016

Related U.S. Application Data

(63) Continuation of application No. PCT/JP2015/062670, filed on Apr. 27, 2015.

(30) Foreign Application Priority Data

Apr. 30, 2014 (JP) ................................. 2014-093557

(51) Int. Cl.
*F23R 3/18* (2006.01)
*F23R 3/34* (2006.01)
(Continued)

(52) U.S. Cl.
CPC ................. *F23R 3/18* (2013.01); *F01D 25/24* (2013.01); *F01D 25/305* (2013.01); *F02K 1/822* (2013.01);
(Continued)

(58) Field of Classification Search
CPC .......... F01D 25/305; F02K 1/822; F02K 3/10; F23R 3/18; F23R 3/20; F23R 3/286; F23R 3/34
See application file for complete search history.

(56) References Cited

U.S. PATENT DOCUMENTS

| 445,339 A | 1/1891 | Rhodes |
| 3,085,401 A | 4/1963 | Lefebvre et al. |
| | (Continued) | |

FOREIGN PATENT DOCUMENTS

| JP | 49-92423 | 9/1974 |
| JP | 1-189420 | 7/1989 |
| | (Continued) | |

OTHER PUBLICATIONS

Extended Search Report dated Sep. 1, 2017 in European Patent Application No. 15785388.8.
(Continued)

*Primary Examiner* — Scott Walthour
(74) *Attorney, Agent, or Firm* — Oblon, McClelland, Maier & Neustadt, L.L.P.

(57) ABSTRACT

The present embodiment sufficiently ensures the ignition stability and the flame-holding property of an afterburner while suppressing a reduction in the efficiency of an aircraft engine. A flame holder is disposed directly downstream of an injection hole of a fuel injector in a liner. The flame holder comprises: a ring-shaped annulus flame-holding member which is provided on the inner circumferential surface of the liner and is capable of propagating a flame in the circumferential direction; and a plurality of radial flame-holding members which are radially disposed inwards of the annulus flame-holding member and are capable of propagating the flame in the radial direction. A guide ring is provided inwards of the radial flame-holding members, and a ring-shaped guide channel that guides a fuel-containing mixed gas in the downstream direction is formed between the outer peripheral surface of the guide ring and the inner peripheral surface of the annulus flame-holding member.

7 Claims, 4 Drawing Sheets

(51) Int. Cl.
  *F02K 3/10*   (2006.01)
  *F23R 3/20*   (2006.01)
  *F01D 25/24*  (2006.01)
  *F01D 25/30*  (2006.01)
  *F23R 3/28*   (2006.01)
  *F02K 1/82*   (2006.01)

(52) U.S. Cl.
  CPC .................. *F02K 3/10* (2013.01); *F23R 3/20* (2013.01); *F23R 3/28* (2013.01); *F23R 3/286* (2013.01); *F23R 3/34* (2013.01); *F05D 2220/323* (2013.01); *F05D 2240/35* (2013.01); *Y02T 50/675* (2013.01)

(56) References Cited

U.S. PATENT DOCUMENTS

| | | | |
|---|---|---|---|
| 3,765,178 A | | 10/1973 | Hufnagel et al. |
| 3,931,707 A | * | 1/1976 | Vdoviak .................. F23R 3/20 60/765 |
| 4,170,111 A | | 10/1979 | Lewis et al. |
| 4,203,285 A | | 5/1980 | Hanloser et al. |
| 5,076,062 A | | 12/1991 | Abreu |
| 5,396,761 A | | 3/1995 | Woltmann et al. |
| 7,565,804 B1 | | 7/2009 | Frash et al. |
| 2008/0098740 A1 | | 5/2008 | Roberts et al. |

FOREIGN PATENT DOCUMENTS

| | | |
|---|---|---|
| JP | 6-137213 | 5/1994 |
| JP | 8-135503 | 5/1996 |
| JP | 9-4511 | 1/1997 |
| JP | 9-119346 | 5/1997 |
| JP | 9-242609 | 9/1997 |
| JP | 2723488 | 3/1998 |
| JP | 2003-227410 | 8/2003 |
| JP | 2008-8606 | 1/2008 |
| JP | 2012-132630 | 7/2012 |
| JP | 2013-181473 | 9/2013 |

OTHER PUBLICATIONS

English Translation of International Search Report dated Jul. 21, 2015 in PCT/JP2015/062670, filed Apr. 27, 2015.
Written Opinion dated Jul. 21, 2015 in PCT/JP2015/062670, filed Apr. 27, 2015.

* cited by examiner

AFTERBURNER AND AIRCRAFT ENGINE

CROSS REFERENCE TO RELATED APPLICATIONS

This application is a continuation application of international application No. PCT/JP2015/062670 filed Apr. 27, 2015, which claims priority to Japanese Patent Application No. 2014-093557 filed Apr. 30, 2014, each of which is hereby incorporated by reference in their entity.

BACKGROUND

1. Field

The present embodiment relates to an afterburner or the like which supplies fuel to a gas mixture of combustion gas discharged from a core flow path of an aircraft engine and air discharged from a fan flow path of the aircraft engine for burning (afterburning) to increase thrust of the aircraft engine.

2. Description of Related Art

Various studies and developments are being made on afterburners in recent years according to demand for increasing thrust of aircraft engines. The configuration of a general afterburner is briefly described below.

In the outlet side (the rear side) of an engine case of an aircraft engine, a rear duct (an exhaust duct) is provided. Within the rear duct, a cylindrical liner is provided, through which a gas mixture flows. The rear duct is provided with a fuel injector which injects fuel liquid in the liner. Downstream of the fuel injector in the rear duct, an igniter (an ignition plug) is provided. The igniter ignites the gas mixture containing the fuel in the liner. Downstream of the fuel injector in the liner, a flame holder which holds flame is provided. The flame holder includes: plural radial flame holding members which are provided in a radial fashion within the liner and are capable of propagating flame in the radial direction; and an annulus flame holding member which is situated away from the inner circumferential surface of the liner, concentrically with the plural radial flame holding members and is capable of propagating flame in the circumferential direction.

The conventional arts relating to the present embodiment are disclosed in Patent Documents 1 and 2.

PATENT DOCUMENTS

Patent Document 1: JP 2008-8606 A
Patent Document 2: JP H9-4511 A

SUMMARY

The diffused state (diffusion properties) of the fuel injected from the fuel injector in the liner depends on the operating state (operation conditions) of the aircraft engine. In a certain operating state of the aircraft engine, the fuel cannot be supplied to an ignition place of the igniter at proper evaporated state and proper concentration at the same time or just before the gas mixture containing the fuel is ignited by the igniter. In such a case, it is difficult to ignite the gas mixture containing the fuel with the igniter, and the ignition stability of the afterburner is lowered.

Moreover, to increase the flame propagation in the flame holder and ensure sufficient flame holding capability (burning stability) of the afterburner, the flame holder needs to include not only plural radial flame holding members capable of propagating flame in the radial direction but also the annulus flame holding member capable of propagating flame in the circumferential direction as described above. When the annulus flame holding member is situated at a position away from the inner circumferential surface of the liner, the annulus flame holding member interferes with the main flow of the gas mixture in the liner, and pressure loss (thrust loss) in the liner is increased. The engine efficiency of the aircraft engine is therefore reduced.

Such an aircraft engine therefore has a problem that it is difficult to ensure sufficient ignition stability and flame holding capability of the afterburner while preventing a decrease in engine efficiency of the aircraft engine.

Accordingly, an object of the present embodiment is to provide an afterburner having a new configuration and the like which are capable of solving the aforementioned problem.

A first aspect of the present embodiment is an afterburner which supplies fuel to a gas mixture of combustion gas discharged from a core flow path (a main flow path) of an aircraft engine and air discharged from a fan flow path (a bypass flow path) of the aircraft engine for burning (afterburning) to increase thrust of the aircraft engine, the afterburner including: a rear duct (an exhaust duct) provided at the outlet behind of an engine case of the aircraft engine; a cylindrical liner which is provided within the rear duct and allows the gas mixture to flow; a fuel injector which injects the fuel in the form of liquid in the liner; an igniter (an ignition plug) which is provided downstream of the fuel injector (downstream of the injection place of the fuel injector) and ignites (lights) the gas mixture containing the fuel in the liner; a flame holder which is situated directly downstream of the fuel injector and is configured to hold flame, the flame holder including: an annulus flame holding member which is provided on the inner circumferential surface (the inner wall surface) of the liner and propagates flame in the circumferential direction; and a plurality of radial flame holding members which are situated in a radial fashion inside the annulus flame holding member and propagate flame in the radial direction; and a guide ring (an annular guiding member) which is provided inside the annulus flame holding member, in which an annular guide flow path is formed between the outer circumferential surface (the outer wall surface) of the guide ring and the inner circumferential surface of the annulus flame holding member and is configured to guide the gas mixture containing the fuel downstream.

Herein, in the claims and specification of the application, the meaning of "to be provided" includes "to be directly provided" and also "to be indirectly provided with another member interposed". The meaning of "to be situated" includes "to be directly situated" and also "to be indirectly situated with another member interposed". The "downstream" refers to downstream in the flowing direction of main flow of combustion gas, air, or gas mixture and means that the direction towards the back of the aircraft engine. The "upstream" refers to upstream in the flowing direction of combustion gas, air or gas mixture and means the direction towards the front of the aircraft engine. The "inner diameter decreases towards the downstream end" means that the inner diameter decreases towards the downstream as a whole and includes a case where the inner diameter does not continually decrease towards the downstream end. Similarly, the "outer diameter decreases towards the downstream end" means that the outer diameter decreases towards the downstream end as a whole and includes a case where the outer diameter does not continually decrease towards the downstream end. Moreover, "the radial direction" refers to the radial direction of the aircraft engine (in other words, the radial direction of the rear duct or the liner). "The axial direction" refers to the axial direction of the aircraft engine (in other words, the axial direction of the rear duct or the liner).

According to the first aspect, when the fuel is injected from the fuel injector in the liner during operation of the aircraft engine, the air containing the fuel is introduced from the inlet of the guide flow path into the guide flow path and flows through the guide flow path. The air containing the fuel then flows out of the outlet of the guide flow path to the ignition place of the igniter (directly downstream of the annulus flame holding member). The igniter ignites the gas mixture containing the fuel to form flame downstream (directly downstream) of the flame holder while burning the gas mixture containing the fuel in the liner (afterburning). A lot of heat energy is thereby put into the combustion gas within the liner, thus increasing the thrust of the aircraft engine.

Herein, the air containing the fuel is introduced into the guide path flow from the inlet of the guide flow path and flows out of the outlet of the guide flow path to the ignition place of the igniter. This can prevent diffusion of the fuel in the liner and supply the fuel to the ignition place of the igniter at proper concentration and proper evaporated state. In other words, fuel can be supplied to the ignition place of the igniter at proper concentration and proper evaporated state independently of the operating state (the operation conditions) of the aircraft engine at the same time or just before the gas mixture containing the fuel is ignited by the igniter.

The flame holder includes the annulus flame holding member capable of propagating flame in the circumferential direction as well as the plural radial flame holding members capable of propagating flame in the radial direction. This enhances flame propagation of the flame holder. Moreover, since the annulus flame holding member is provided on the inner circumferential surface of the liner, the annulus flame member is prevented from interfering with the main flow of the gas mixture within the liner 31, and pressure loss (thrust loss) in the liner 31 is minimized.

A second aspect of the present embodiment is an aircraft engine which generates thrust by discharging combustion gas (combustion gas and air) rearward, the aircraft including an afterburner according to the first aspect.

According to the second aspect, it is possible to exert the same operation as the operation according to the first aspect.

According to the present embodiment, fuel can be supplied to the ignition place of the igniter at proper concentration and proper evaporated state independently of the operating state of the aircraft engine at the same time or just before the gas mixture containing the fuel is ignited by the igniter. Accordingly, fuel can be stably ignited by the igniter, ensuring sufficient ignition stability of the afterburner. Moreover, the flame propagation of the flame holder is enhanced while the pressure loss in the liner is minimized by preventing the interference between the annulus flame holding member and the main flow of the gas mixture within the liner. This ensures sufficient flame holding capability (burning stability) of the afterburner 25 while preventing a decrease in engine efficiency of the aircraft engine. According to the embodiment of the present disclosure, it is possible to ensure sufficient ignition stability and flame holding capability of the afterburner while preventing a decrease in engine efficiency of the aircraft engine.

DETAILED DESCRIPTION OF EMBODIMENTS

Figure 1:
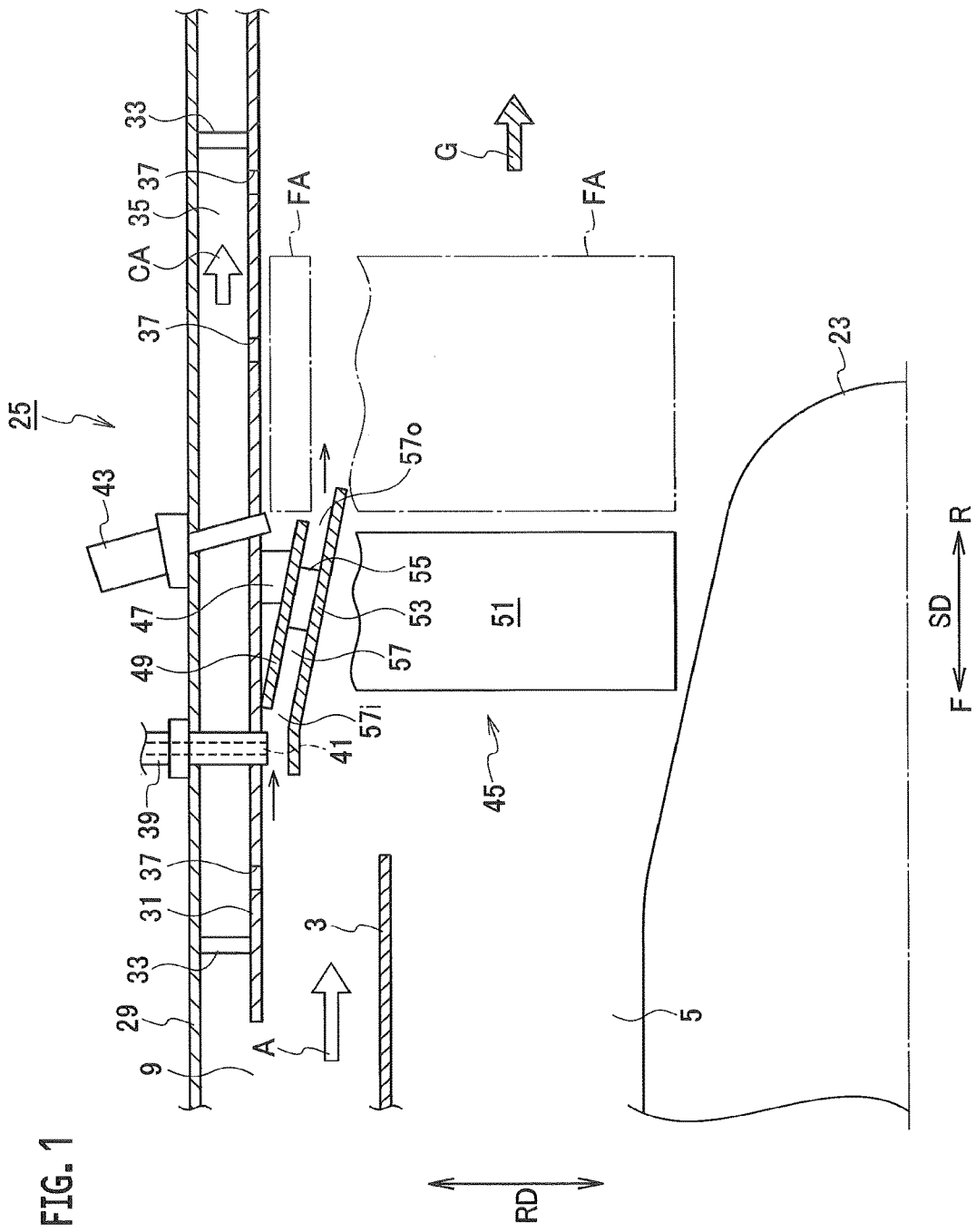
FIG. 1 is a cross-sectional side view of an afterburner according to an embodiment of the present disclosure, which is an enlarged view of part I indicated by an arrow in FIG. 4.

A description is given of an embodiment of the present disclosure with reference to FIGS. 1 to 4. In the drawings, F indicates the forward direction (the upstream direction); R, the backward direction (the downstream direction); SD, the axial direction; RD, the radial direction; and CD, the circumferential direction.

Figure 4:
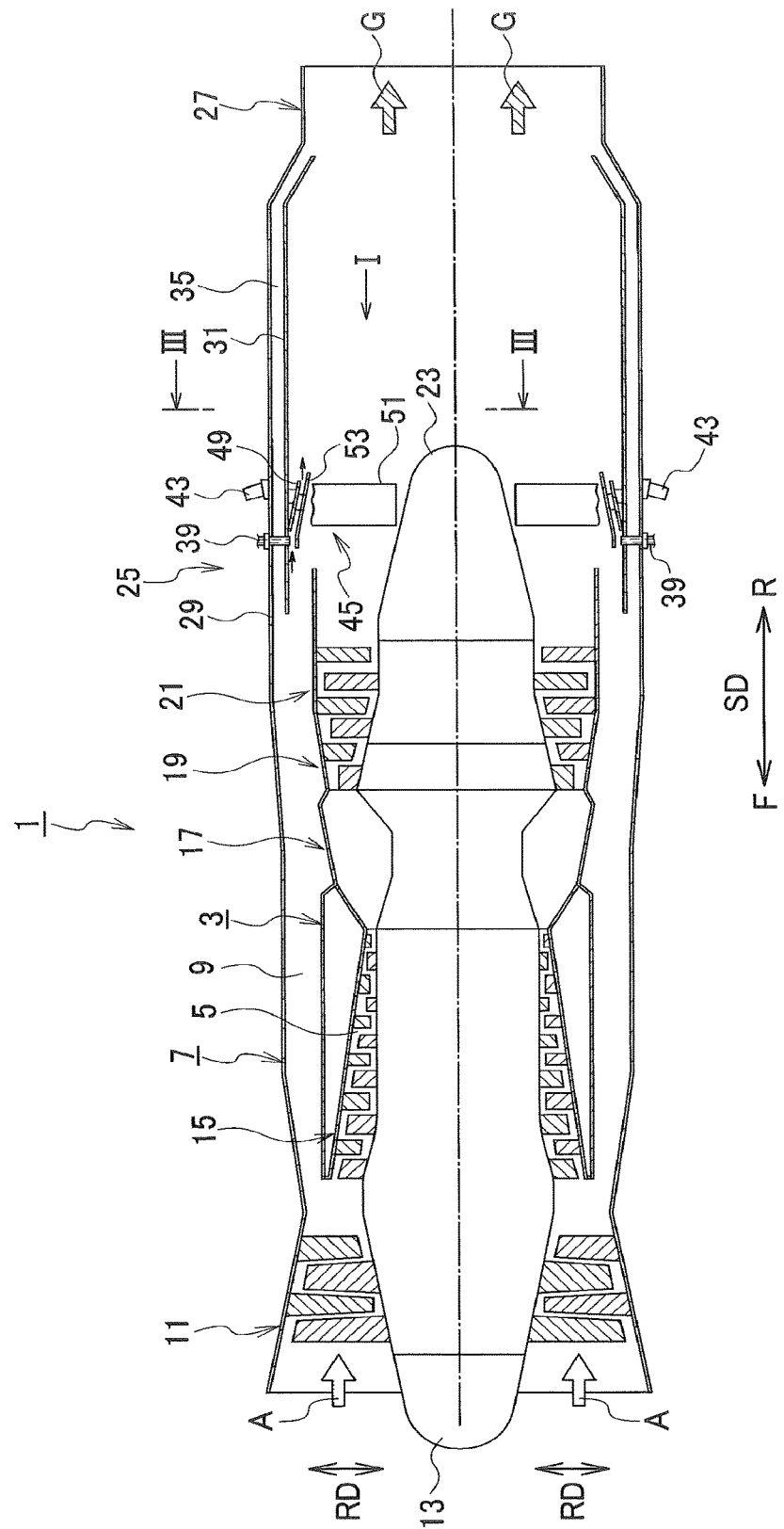
FIG. 4 is a cross-sectional side view of the aircraft engine according to the embodiment of the present disclosure.

As illustrated in FIG. 4, an aircraft engine 1 according to the embodiment of the present disclosure is a device which discharges combustion gas (high-temperature gas) G and air (low-temperature air) A rearward to generate thrust (engine thrust). The aircraft engine 1 includes a cylindrical core case (an engine inner cylinder) 3, inside of which an annular core flow path (a main flow path) 5 is formed. Outside of the core case 3, a cylindrical engine case (an engine outer cylinder) 7 is situated concentrically with the core case 3. Between the inner circumferential surface of the engine case 7 and the outer circumferential surface of the core case 3, an annular fan flow path (a bypass flow path) 9 is formed.

Within front part of the engine case 7, a fan 11 is situated, which takes air A into the core flow path 5 and fan flow path 9. In front of the center of the fan 11, an inlet cone 13 guiding the air A rearward is situated. Behind the fan 11, a compressor 15 is situated. The compressor 15 compresses the air A taken into the core flow path 5. Behind the compressor 15, a burner 17 is situated. The burner 17 burns the air A containing the fuel to generate combustion gas G.

Behind the burner 17, a high-pressure turbine 19 is situated. The high-pressure turbine 19 is driven by expansion of the combustion gas G from the burner 17 and drives the compressor 15 in conjunction with the same. Behind the high-pressure turbine 19, a low-pressure turbine 21 is provided. The low-pressure turbine 21 is driven by expansion of the combustion gas G and drives the fan 11 in conjunction with the same. Moreover, within rear part of the core case 3, a tail cone 23 guiding the combustion gas G rearward is provided concentrically with the core case 3. The tail cone 23 protrudes rearward from the core case 3.

In rear part of the engine case 7, an afterburner 25 is situated. The afterburner 25 supplies fuel to a gas mixture of the combustion gas G discharged from the core flow path 5 and the air (low-temperature air) A from the fan flow path 9 for burning (afterburning) to increase the thrust (engine thrust) of the aircraft engine 1. Behind the afterburner 25, an exhaust nozzle 27 is situated. The exhaust nozzle 27 discharges the combustion gas G and air A (the gas mixture of the combustion gas G and air A).

Next, a description is given of the concrete configuration of the afterburner 25 according to the embodiment of the present disclosure.

Figure 2:
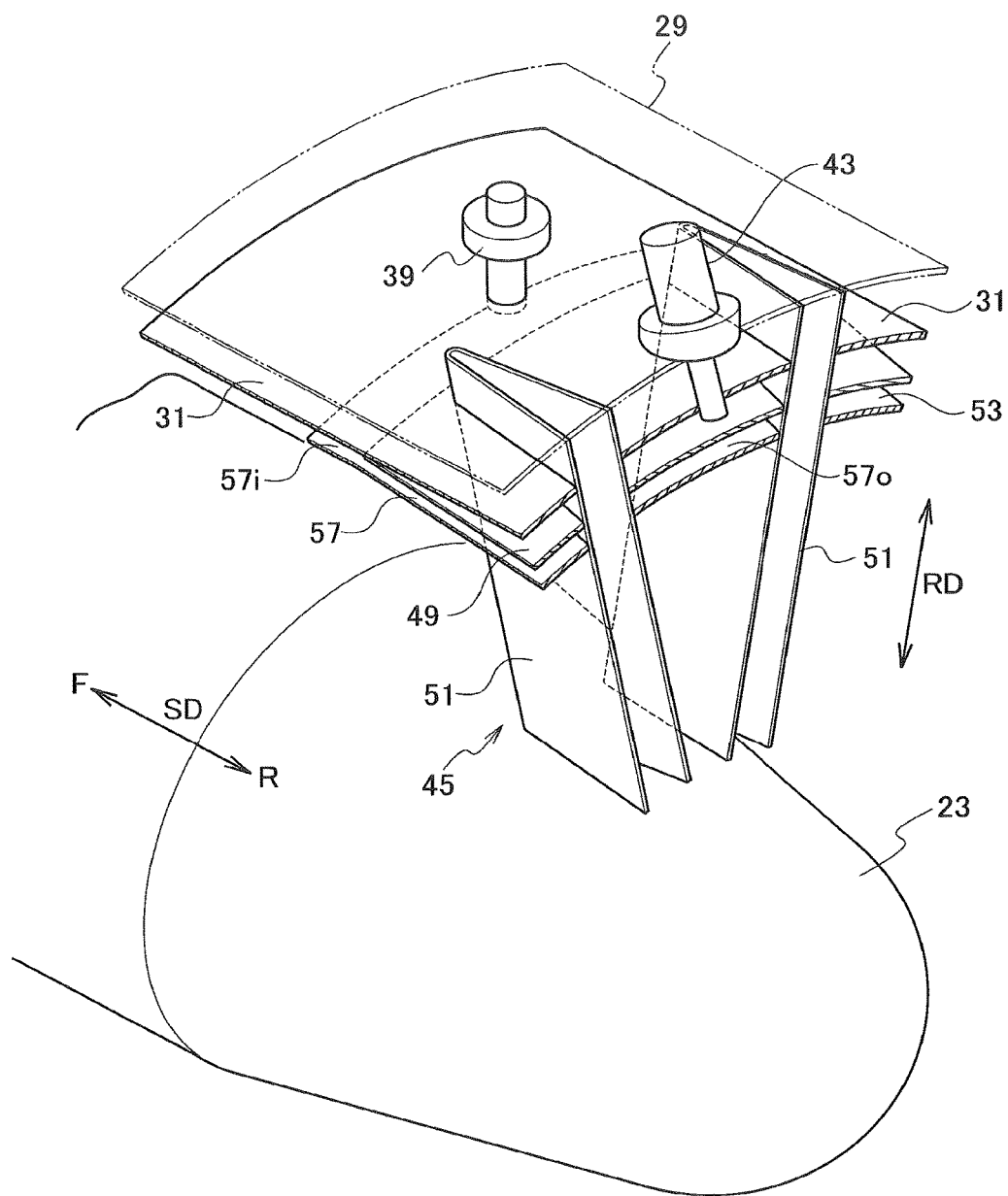
FIG. 2 is a perspective view of characteristic part of the afterburner according to the embodiment of the present disclosure.
Figure 3:
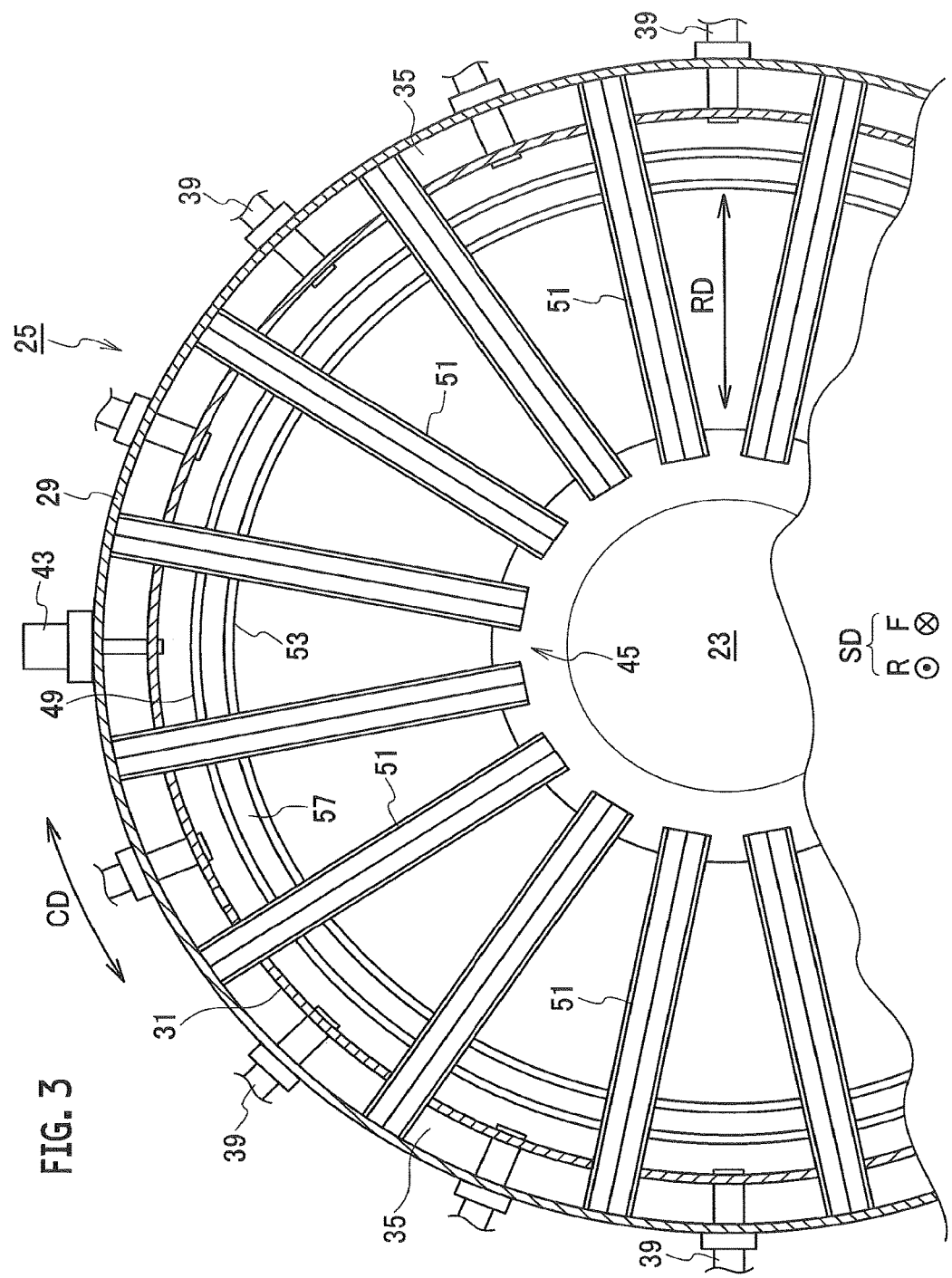
FIG. 3 is an enlarged view taken along a line III-III in FIG. 4.

As illustrated in FIGS. 1 to 3, a rear duct (an exhaust duct) 29 is situated concentrically with the engine case 7 downstream of (behind) the engine case 7. Within the rear duct 29, a cylindrical liner 31 is situated concentrically with the rear duct 29 with plural supports 33 (one of which is illustrated in FIG. 1) interposed therebetween. The liner 31 allows the combustion gas G and air A to flow rearward. The cross section of the liner 31 along the axial direction (the axial direction of the aircraft engine 1) may be corrugated. Between the outer circumferential surface (the outer wall surface) of the liner 31 and the inner circumferential surface (the inner wall surface) of the rear duct 29, an annular cooling flow path 35 is formed, through which a part of the air A discharged from the fan path flow 9 flows as cooling air CA. Moreover, plural penetrating cooling holes 37 are formed evenly across the liner 31. The plural cooling holes 37 are configured to blow out the cooling air CA along the inner circumferential surface of the liner 31. To mix the combustion gas G discharged from the core flow path 5 and the air A discharged from the fan flow path 9A, a publicly known mixer (not illustrated, see JP 2013-181473 A and JP 2012-132630 A, for example) may be situated in rear part of the core case 3.

The rear duct 29 is provided with plural hollow stick-shaped fuel injectors 39 which inject liquid fuel within the liner 31. The fuel injectors 39 are situated at intervals in the circumferential direction (in a predetermined circumferential direction). The plural fuel injectors 39 are connected to a fuel supply source (not illustrated) which supplies the liquid fuel. The top of each fuel injector 39 penetrates the liner 31. At the top of each fuel injector 39, an injection hole 41 is formed. The injection hole 41 can inject the liquid fuel. Downstream of the injection holes 41 (injection positions) of the fuel injectors 39 in the rear duct 29, plural igniters (ignition plugs) 43 are situated at intervals in the circumferential direction. The igniters 43 ignite (light) the gas mixture containing the fuel within the liner 31. The top of each igniter 43 penetrates the liner 31. Instead of the plural hollow stick-shaped fuel injectors 39 provided for the rear duct 29, a hollow annular fuel injector (not illustrated) which injects liquid fuel in the liner 31 may be provided on the inner wall surface of the liner 31.

Directly downstream of the injection holes 41 of the fuel injectors 39 in the liner 31, a flame holder 45 to hold flame is provided. The flame holder 45 includes an annulus flame holding member 49 and plural radial flame holding members 51. The annulus flame holding member 49 is provided on the inner circumferential surface (the inner wall surface) of the liner 31 with plural supports 47 (one of which is illustrated in FIG. 1) interposed therebetween and is capable of propagating flame in the circumferential direction. The plural radial flame holding members 51 are situated in a radial fashion inside the annulus flame holding member 49 and are capable of propagating flame in the radial direction. The annulus flame holding member 49 includes plural circular flame holding segments 53 separated in the circumferential direction. The annulus flame holding member 49 is capable of forming a flame holding area (a low-speed area) FA downstream (directly downstream) thereof. The inner diameter of the annulus flame holding member 49 decreases towards the downstream end thereof. The base end (the outside end in the radial direction) of each radial flame holding member 51 is fixed to the rear duct 29. The radial flame holding members 51 are capable of forming the flame holding area FA downstream (directly downstream) thereof. The cross section of each radial flame holding member 51 along the direction orthogonal to the radial direction has a V shape opened downstream. The annulus flame holding member 49 may be composed of plural circular flame holding segments (not illustrated) separated in the circumferential direction.

Inside the annulus flame holding member 49, a guide ring (an annular guide member) 53 is provided concentrically with the radial flame holding member 49 with plural supports 55 (one of which is illustrated in FIG. 1) interposed therebetween. The outer diameter of the guide ring 53 decreases towards the downstream end thereof. The upstream end (the edge on the upstream side) of the guide ring 53 is located upstream of the injection holes 41 of the fuel injectors 39. Between the outer circumferential surface (the outer wall surface) of the guide ring 53 and the inner circumferential surface of the annulus flame holding member 49, an annular guide flow path 57, which guides the gas mixture containing fuel downward, is formed. Herein, an inlet 57i of the guide flow path 57 is located near the injection holes 41 of the fuel injectors 39 while an outlet 57o of the guide flow path 57 is located near the ignition places of the igniters 43 (directly downstream of the annulus flame holding member 49). The guide ring 53 may be composed of plural circular guide segments (not illustrated) separated in the circumferential direction.

Subsequently, a description is given of the operation and effects of the embodiment of the present disclosure.

When a proper starter device (not illustrated) is operated to drive the fan 11 and compressor 15, the air A is taken into the core flow path 5 and fan flow path 9 by the fan 11, and the air A taken into the core flow path 5 is compressed by the compressor 15. Next, the air A containing fuel is burned by the burner 17 to generate high-pressure combustion gas. By expansion of the combustion gas, the high-pressure turbine 19 and low-pressure turbine 21 are driven to drive the compressor 15 and fan 11 in conjunction. Moreover, the series of operations (drive of the fan 11, drive of the compressor 15, burning by the burner 17, drive of the high-pressure turbine 19, and drive of the low-pressure turbine 21) are successively performed to operate the aircraft engine 1. Accordingly, during the operation of the aircraft engine 1, the combustion gas G having passed through the core flow path 5 and the air A having passed through the fan path flow 9 are discharged rearward from the exhaust nozzle 27 to generate thrust of the aircraft engine 1 (engine thrust). The air A discharged from the exhaust nozzle 27 covers the combustion gas G discharged from the exhaust nozzle 27 (normal operation of the aircraft engine 1).

When fuel is injected from the plural fuel injectors 39 in the liner 31 during operation of the aircraft engine 1, the air A containing the fuel is introduced from the inlet 57i of the guide flow path 57 into the guide flow path 57 and flows through the guide flow path 57. The air A containing the fuel then flows out of the outlet 57o of the guide flow path 57 to the ignition places of the plural igniters 43 (directly downstream of the annulus flame holding member 49). The plural igniters 43 ignite the gas mixture containing the fuel to form flame downstream (directly downstream) of the flame holder 45 while burning the gas mixture containing the fuel in the liner 31 (afterburning). A lot of heat energy is thereby put into the combustion gas within the liner 31, thus increasing the thrust of the aircraft engine 1.

On the other hand, a part of the air A discharged from the fan flow path 9 flows through the cooling flow path 35 as the cooling air CA during operation of the aircraft engine 1. The liner 31 is thereby convection-cooled. Moreover, the cooling air CA having contributed to the convection cooling of the liner 31 is blown out from the plural cooling holes 37 and forms the film cooling layer (not illustrated) covering the inner circumferential surface of the liner 31. The liner 31 is thereby film-cooled. The cooling air CA having contributed to the film cooling of the liner 31 becomes a part of the gas mixture (normal operation of the afterburner 25).

Herein, the air A containing the fuel is introduced into the guide path flow 57 from the inlet 57i of the guide flow path 57 and flows out of the outlet 57o of the guide flow path 57 to the ignition places of the plural igniters 43. This can prevent diffusion of fuel in the liner 31 and supply the fuel to the ignition places of the plural igniters 43 at proper concentration and proper evaporated state. The upstream end of the guide ring 53 is located upstream of the injection holes 41 of the fuel injectors 39 in particular. This promotes the air A containing the fuel to be introduced into the guide flow path 57, further preventing diffusion of the fuel within the liner 31. In other words, fuel can be supplied to the ignition places of the plural igniters 43 at proper concentration and proper evaporated state independently of the operating state (the operation conditions) of the aircraft engine 1 at the same time or just before the gas mixture containing the fuel is ignited by the plural igniters 43.

The flame holder 45 includes the annulus flame holding member 51 capable of propagating flame in the circumferential direction as well as the plural radial flame holding members 51 capable of propagating flame in the radial direction. This enhances flame propagation of the flame holder 45. Moreover, since the annulus flame holding member 49 is provided on the inner circumferential surface of the liner 31, the annulus flame member 49 is prevented from interfering with the main flow of the gas mixture within the liner 31, and pressure loss (thrust loss) in the liner 31 is therefore minimized (characteristic operation of the afterburner 25).

According to the embodiment of the present disclosure, fuel can be supplied to the ignition places of the plural igniters 43 at proper concentration and proper evaporated state independently of the operating state of the aircraft engine 1 at the same time or just before the gas mixture containing the fuel is ignited by the plural igniters 43. Accordingly, fuel can be stably ignited by the plural igniters 43, ensuring sufficient ignition stability of the afterburner 25. Moreover, the flame propagation of the flame holder 45 is enhanced while the pressure loss in the liner 31 is minimized by preventing the interference between the annulus flame holding member 49 and the main flow of the gas mixture within the liner 31. This ensures sufficient flame holding capability (burning stability) of the afterburner 25 while preventing a decrease in engine efficiency of the aircraft engine 1. According to the embodiment of the present disclosure, it is possible to ensure sufficient ignition stability and flame holding capability of the afterburner 25 while preventing a decrease in engine efficiency of the aircraft engine 1.

The present disclosure is not limited to the description of the above embodiment and can be embodied in various modes. The scope of the present disclosure is not limited to these embodiments.

While embodiments have been exemplified with the help of the drawings, many modifications and changes are apparent to those skilled in the art.

What is claimed is:

1. An afterburner configured to supply fuel for burning in a gas mixture of combustion gas and air, the combustion gas being discharged from a core flow path of an aircraft engine and the air being discharged from a fan flow path of the aircraft engine, the afterburner configured to increase thrust of the aircraft engine, the afterburner comprising:
    a rear duct provided at an outlet of an engine case of the aircraft engine;
    a cylindrical liner positioned within the rear duct and configured to receive the combustion gas and air;
    a fuel injector configured to inject the fuel in the form of liquid in the cylindrical liner;
    an igniter positioned downstream of the fuel injector and configured to ignite the gas mixture containing the fuel in the cylindrical liner;
    a flame holder positioned downstream of the fuel injector and configured to hold flame, the flame holder including:
        an annulus flame holding member which is provided on an inner circumferential surface of the cylindrical liner in contact therewith and configured to propagate flame in a circumferential direction; and
        a plurality of radial flame holding members which are oriented radially inside the annulus flame holding member and configured to propagate flame in a radial direction;
    and
    a guide ring which is provided inside the annulus flame holding member, wherein an annular guide flow path is formed between an outer circumferential surface of the guide ring and an inner circumferential surface of the annulus flame holding member, the guide ring being configured to guide the gas mixture containing the fuel in a downstream direction.

2. The afterburner according to claim 1, wherein an upstream end of the guide ring is located upstream of the fuel injector.

3. An aircraft engine configured to generate thrust by discharging combustion gas rearward, comprising the afterburner according to claim 1.

4. An aircraft engine configured to generate thrust by discharging combustion gas rearward, comprising the afterburner according to claim 2.

5. The afterburner according to claim 1, wherein an outer circumferential surface of the annulus flame holding member abuts the inner circumferential surface of the cylindrical liner at an upstream end of the annulus flame holding member.

6. The afterburner according to claim 5, wherein a first support is provided between the inner circumferential surface of the cylindrical liner and the outer circumferential surface of the annulus flame holding member, and a second support is provided between the outer circumferential surface of the guide ring and the inner circumferential surface of the annulus flame holding member.

7. The afterburner according to claim 6, wherein a downstream end of the first support is further downstream than a downstream end of the second support.

* * * * *